US005982888A

United States Patent [19]

Luckeneder et al.

[11] Patent Number: 5,982,888

[45] Date of Patent: Nov. 9, 1999

[54] PROGRAMMABLE KEY AND RECEPTACLE SYSTEM AND METHOD THEREFOR

[75] Inventors: Walter Luckeneder, Mesa; Chris M. Lawcock, Phoenix, both of Ariz.

[73] Assignee: American Game Technologies, Phoenix, Ariz.

[21] Appl. No.: 08/799,342

[22] Filed: Feb. 13, 1997

[51] Int. Cl.[6] .......... H04L 9/00

[52] U.S. Cl. .......... 380/4

[58] Field of Search .......... 380/4, 52, 59, 380/49

[56] References Cited

U.S. PATENT DOCUMENTS

| | | | |
|---|---|---|---|
| 4,578,573 | 3/1986 | Flies et al. . | |
| 4,789,859 | 12/1988 | Clarkson et al. . | |
| 5,193,114 | 3/1993 | Moseley | 380/49 |
| 5,245,329 | 9/1993 | Gokcebay . | |
| 5,337,043 | 8/1994 | Gokcebay . | |
| 5,475,376 | 12/1995 | Chikamitue et al. . | |
| 5,491,471 | 2/1996 | Stobbe . | |
| 5,526,662 | 6/1996 | Diekhoff et al. . | |

*Primary Examiner*—Salvatore Cangialosi
*Attorney, Agent, or Firm*—Harry M. Weiss; Jeffrey Weiss; Paul W. Davis

[57] ABSTRACT

A combination programmable key for storing encrypted data and a receptacle system for reading and programming the programmable key. The programmable key uses a memory storage unit which may be programmed and reprogrammed to store the encrypted data. A receptacle system is used for reading and programming the memory storage unit. The receptacle system has a front plate having a centrally located aperture through which the programmable key is inserted when the receptacle system is to read and/or program the programmable key. A terminal block is coupled to the front plate. The terminal block houses a plurality of contact terminals which are used for contacting the memory storage unit of the programmable key in order to allow a programming device coupled to the receptacle system to read and program the memory storage unit.

17 Claims, 1 Drawing Sheet

PROGRAMMABLE KEY AND RECEPTACLE SYSTEM AND METHOD THEREFOR

BACKGROUND OF THE INVENTION

1. Field of the Invention

This invention relates generally to programmable keys and, more specifically, to a programmable key for storing encrypted data and a receptacle system for reading and programming the programmable key.

2. Description of the Prior Art

Presently, there are numerous types of programmable electronic keys. These electronic keys may be used for a variety of different purposes. For example, the programmable key could be used as a cash key, hotel key, data storage for storing information related to the individual holder, etc. However, many of the present methods used for above mentioned purposes have inherent flaws associated with them which will be addressed below.

Magnetic strip cards are one example of an electronic key which has been in use for the last several years. The majority of adults in the United States use a magnetic strip card for one reason or another. Magnetic strip cards are most frequently associated with credit cards and Automatic Teller Machine (ATM) cards. While the magnetic strip card may be widely used, it is susceptible to fraud and damage. New specialized optical encoding methods, as well as personal pictures on the front of the magnetic strip cards, have been implemented in order to help reduce the amount of credit card fraud. These precautions still do not deter a technically knowledgeable person from making a fraudulent card and using it in an ATM where no human presence is available to visually inspect the person and the magnetic strip card. Furthermore, most magnetic strip cards are extremely vulnerable to magnetic fields which can erase or damage the important 18 to 36 bytes of data stored on the card. When this happens, the customer's magnetic strip card is regulated to being a ticket from which a human attendant must manually enter in the account information on the front of the card. If the customer is unlucky enough to be at an ATM, the customer will not be able to get the needed funds.

Smart cards are a recent step towards greater security and flexibility in monetary transfer. Each smart card contains an integrated circuit which may be a EEPROM, ROM, RAM, processor, or a combination of the four. Already, throughout Europe, smart cards have been successfully hacked and emulated in both phone cards and satellite television applications. Due to the availability of complete technical specification and information on the smart card, a novice electronic hobbyist may be able to read and emulate a smart card.

The smart card's flaws do not stop there. Not only may smart cards be forged and emulated, but several different standards exist for smart cards. Currently, most smart cards are designed with eight (8) contacts, six (6) of which are utilized in data transfer and storage. However, contact positions on the cards vary widely and many manufacturers have developed smart cards with more than the normal eight (8) contacts. This means that if at any time a new smart card standard takes effect, most people will be forced to retrofit any device that utilizes a smart card with a new reader that will accommodate all the different standards. Furthermore, the smart card is readily susceptible to bending and scratched or damaged contacts which cause the data stored on the smart card to be lost or destroyed. In fact, most smart cards come with a warning label stating that the smart card should not be bent or unnecessarily removed form the smart card reader.

Therefore, a need existed to provide an improved programmable electronic key which may be used for the transfer of money and other important information. The improved electronic key must provided maximum security in order to prevent the improved electronic key from being forged and emulated. The improved electronic key must provided data integrity so that important data stored on the improved electronic key will not be lost or destroyed. Furthermore, the improved electronic key must be cost effective. The improved electronic key must be able to provide maximum security and data integrity at a price that is economically feasible to the average consumer.

SUMMARY OF THE INVENTION

In accordance with one embodiment of the present invention, it is an object of the present invention to provide an improved programmable electronic key which may be used for the transfer of money and other important information.

It is another object of the present invention to provide an improved electronic key that provides maximum security in order to prevent the improved electronic key from being forged and emulated.

It is another object of the present invention to provide an improved electronic key that provides extreme data integrity so that important data stored on the improved electronic key will not be lost or destroyed.

It is still another object of the present invention to provide an improved electronic key that is cost effective such that the improved electronic key is able to provide maximum security and data integrity at a price that is economically feasible to the average consumer.

BRIEF DESCRIPTION OF THE PREFERRED EMBODIMENTS

In accordance with one embodiment of the present invention, a combination programmable key for storing encrypted data and a receptacle system for reading and programming the programmable key is disclosed. The programmable key has a memory storage unit which may be programmed and reprogrammed to store the encrypted data. Receptacle means are used for reading and programming the memory storage unit of the programmable key. The receptacle means use a plurality of terminal means for contacting the memory storage unit. When the programmable key is properly inserted into the receptacle means, the plurality of terminal means will allow a programming device coupled to the receptacle means to read and program the memory storage unit.

In accordance with another embodiment of the present invention, a method of providing a combination programmable key for storing encrypted data and a receptacle system for reading and programming the programmable key is disclosed. The method comprises the steps of: providing a programmable key having a memory storage unit wherein the memory storage unit may be programmed and reprogrammed to store the encrypted data; and providing receptacle means for reading and programming the memory storage unit of the programmable key wherein the receptacle means has a plurality of terminal means for contacting the memory storage unit for allowing a programming device coupled to the receptacle means to read and program the memory storage unit.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
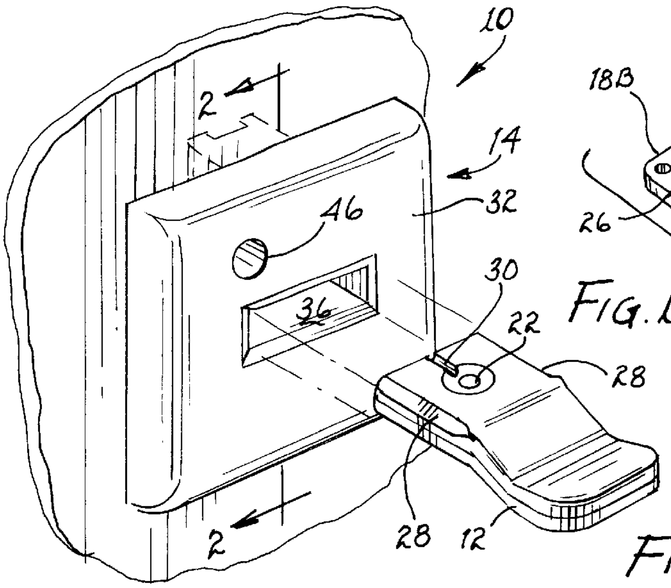
FIG. 1 is an elevated perspective view of the combination programmable key and receptacle system of the present invention.

Referring to FIG. 1, a combination programmable key and reading system 10 (hereinafter combination 10) is shown. The combination 10 has two main components. A programmable key 12 and a receptacle system 14. The programmable key 12 is used for storing and transferring encrypted data. The encrypted data may be monetary data or other important data related to the user. The receptacle system 14 is used for reading and programming the programmable key 12 when the programmable key 12 is properly inserted in the receptacle system 14.

Figure 1A:
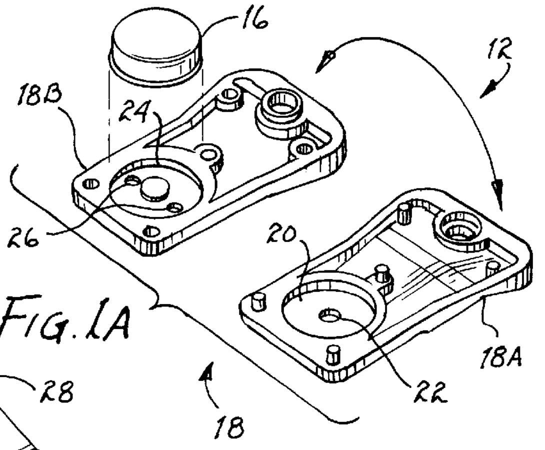
FIG. 1A is an exploded view of the programmable key depicted in FIG. 1.
Figure 2:
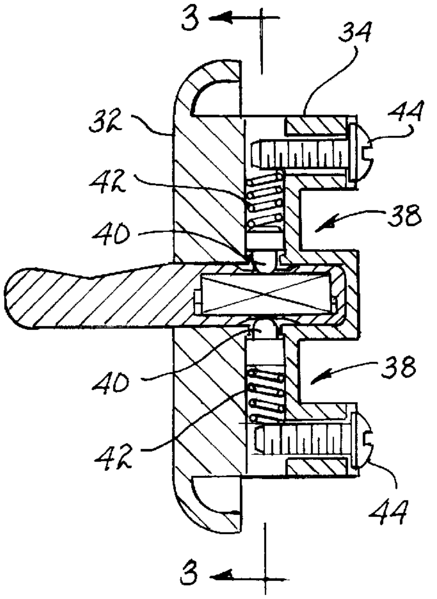
FIG. 2 is a cross-sectional side view of the combination programmable key and receptacle system depicted in FIG. 1 taken along line 2–2.
Figure 3:
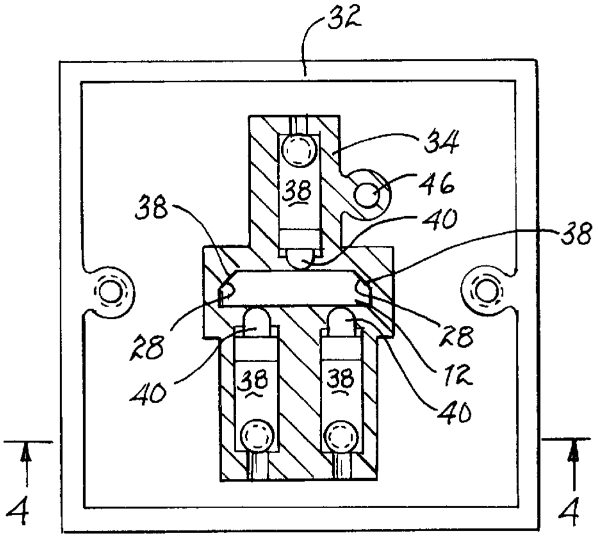
FIG. 3 is a cross-sectional back view of the combination programmable key and receptacle system taken along line 3–3.
Figure 4:
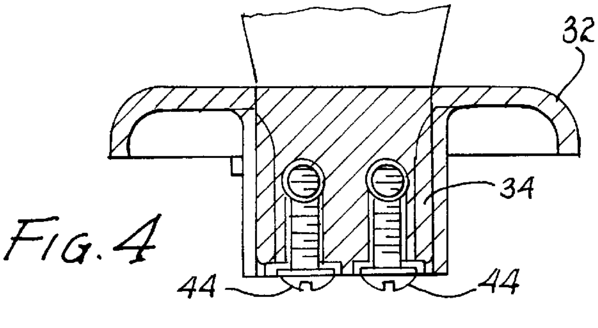
FIG. 4 is a cross-sectional top view of the combination programmable key and receptacle system taken along line 4–4.

Referring now to FIG. 1A, wherein like numerals and symbols denote like elements, a more detailed view of the programmable key 12 is shown. The programmable key 12 uses a memory storage unit 16 for storing the encrypted data. In the preferred embodiment of the present invention, the memory storage unit 16 is a DALLAS SEMICONDUCTOR DS1463 touch memory can. However, it should be noted that other types of memory devices could be used. The memory storage unit 16 has a serial static RAM. The serial static RAM is used for storing the encrypted data, and other information relating to the memory storage unit 16 and data transfers to and from the memory storage unit 16. Stored within the serial static RAM are counters and registers which are used for recording and monitoring data transmissions to and from the memory storage unit 16. Since a copy of the current counters are stored within the serial static RAM, unauthorized data transfers to and from the programmable key 12 can be easily detected. Each memory storage unit 16 has a unique encoded serial number that is stored somewhere within the serial static RAM. The serial number is used to uniquely identify the programmable key 12 and to prevent the unauthorized duplication of the memory storage unit 16.

When trying to decipher the encrypted data stored in the memory storage unit 16, most individuals will try to use the unique serial number of the memory storage unit 16 as the key to encryption/decryption. For that reason, each memory storage unit 16 will have a unique sequence of numbers which are randomly generated and stored in different locations in the serial static RAM. The unique sequence of numbers is used as a seed to produce a key to encrypt and decipher the data stored in the memory storage unit 16. Since each programmable key 12 has its own unique serial number and encryption/decryption number key, no two programmable keys 12 will be exactly the same. This will allow for programmable keys 12 that have maximum security and extreme data integrity for each individual user.

Referring now to FIGS. 1 and 1A, the programmable key has a container 18 which is used for holding the memory storage unit 16. The container 18 has an upper shell 18A and a lower shell 18B. The upper shell 18A has an indentation 20 for holding the memory storage unit 16. The indentation 20 has an aperture 22 therethrough. The aperture 22 is required in order to allow one of the plurality of terminals of the receptacle system 14 to come in contact with the memory storage unit 16 when the programmable key 12 is inserted into the receptacle system 14. The upper shell 18A also has a pair of side beveled edges 28. The side beveled edges 28 are designed to restrict the insertion of the programmable key 12 into the receptacle system 14 to only a single manner.

The lower shell 18B is detachably coupled to the upper shell 18A. Like the upper shell 18A, the lower shell 18B has an indentation 24 which is used for holding the memory storage unit 16. The indentation 24 of the lower shell 18B has a center point which is in axial alignment with a center point of the indentation 22 of the upper shell 18A. The indentation 24 of the lower shell 18B has a pair of apertures 26 therethrough. The pair of apertures 26 are used for allowing two of the plurality of terminals of the receptacle system 14 to come in contact with the memory storage unit 16 when the programmable key 12 is inserted into the receptacle system 14.

Both the upper shell 18A and the lower shell 18B have channelling 30 running from a front edge of each shell 18A and 18B to each aperture in the respective shells 18A and 18B. The channelling 30 is used to align the plurality of terminals within the receptacle system 14 with individual apertures in the upper and lower shells 18A and 18B. This will allow each of the plurality of terminals to come in contact with the memory storage unit 16 when the programmable key 12 is properly inserted into the receptacle system 14.

Referring now to FIGS. 1–4, wherein like numerals and symbols represent like elements, the receptacle system 14 has a front face plate 32 and a terminal block 34. The front face plate 32 has a centrally located aperture 36. The aperture 36 is where the programmable key 12 is inserted into the receptacle system 14 when the programmable key 12 needs to be read or reprogrammed by the receptacle system 14. The aperture 36 has molded rounded edges 38 as can be seen more clearly in FIG. 3. The molded rounded edges 38 work in conjunction with the side beveled edges 28 of the programmable key 12 in order to restrict the insertion of the programmable key 12 into the aperture 36 of the receptacle system 14 to only a single manner.

The receptacle system 14 is further comprised of a terminal block 34. The terminal block 34 is directly coupled to the front face plate 32. The terminal block 34 is used for holding a plurality of terminal contacts 38 which are used for reading and programming the programmable key 12 when the programmable key 12 is properly inserted into the receptacle system 14. The terminal block 34 is coupled to the front face plate 32 such that when the programmable key 12 is fully and properly inserted through the aperture 36 of the front face plate 32, the terminal contacts 38 will be in contact with the memory storage unit 16.

In the preferred embodiment of the present invention, there are three (3) terminal contacts 38 within the terminal block 34. The first terminal contact 38 is an input/output (I/O) terminal contact. The I/O contact is used for reading and programming the memory storage unit 16. The second terminal contact 38 is a ground terminal. The ground terminal is used for establishing ground potential. The third terminal contact 38 is an indicator terminal. The indicator terminal is used for indicating when the programmable key 12 is fully and properly inserted in the receptacle system 14 so the receptacle system 14 may read and or program the programmable key 12.

Each of the terminal contacts 38 are comprised of a contact head 40, a plunger spring 42, and a securing device 44. The contact head 40 is the portion of the terminal contact 38 which actually comes in contact with the memory storage unit 16 when the programmable key 12 is properly inserted into the receptacle system 14. A plunger spring 42 is directly coupled to each contact head 40. The plunger spring 42 is used for supporting each contact head 40 and for providing enough pressure on each contact head 40 to ensure electrical continuity between the memory storage unit 16 and each contact head 40 when the programmable key 12 is fully and properly inserted into the receptacle system 14. A securing device 44 is directly coupled to each plunger spring 42. The securing device 44 is used to hold each plunger spring 42 within the terminal block 34 so that each plunger spring 42 will exert pressure on each contact head 40. This will ensure that when the programmable key 12 is properly and fully inserted into the receptacle system 14, each contact head 40 will be in contact with the memory storage unit 16.

The securing device 44 is also used to provide a contact for a reading/programming device. The reading/programming device would be coupled to the securing device 44 so that the reading/programming device would be able to read and or program the programmable key 12 through the plurality of terminal contacts 38 when the programmable key 12 is inserted into said receptacle system 14. The reading/programming device is generally coupled to the I/O contact. When the programmable key 12 is fully and properly inserted into the receptacle system 14, the reading/programming device is able to properly read, transfer data to and from, and or program the programmable key 12 through the I/O contact. If the programmable key is not properly and fully inserted, the reading/programming device will not be able to read and or program the programmable key 12. Furthermore, if the programmable key 12 is removed from the receptacle system 14 the reading/programming device will not be able to finish the current transaction. The registers/counters within the memory storage unit 16 will realize that the transaction was not completed and will not allow the programmable key 12 to be used in any other receptacle system 14. Thus, the person must return to the original receptacle system 14 and reinsert the programmable key 12 so that the transaction may be completed.

The receptacle system 14 further comprises a light emitting diode (LED) 46. The LED 46 is coupled to the indicator terminal. The LED 46 is used for visually indicating when the programmable key 12 is properly inserted into the receptacle system 14 and for visually indicating when programmable key 12 is being read and or programmed. The LED 46 is a two color LED. When the LED 46 is illuminated in the first color, the receptacle system 14 is indicating that the programmable key 12 may be inserted or removed from the receptacle system 14. When the LED 46 is illuminated in the second color, the receptacle system 14 is indicating that the reading/programming device coupled to the receptacle system 14 is processing (i.e., reading or programming) the programmable key 12 and that the programmable key 12 should not be removed from the receptacle system 14.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. A combination programmable key for storing encrypted data and a receptacle system for reading and programming said programmable key comprising, in combination:

A) a programmable key having a memory storage unit wherein said memory storage unit is programmed to store said encrypted data;

B) receptacle means for reading and programming said memory storage unit of said programmable key wherein said receptacle means has a plurality of terminal means for contacting said memory storage unit for facilitating a programming device coupled to said receptacle means to read and program said memory storage unit; and C) wherein said memory storage unit comprises:

1) memory storage area means for storing said encrypted data;

2) a unique encoded serial number means stored within said memory storage area means for uniquely identifying said programmable key and for preventing unauthorized duplication of said memory storage unit; and 3) counter register means stored in said memory storage area means for recording and monitoring all transmissions to and from said memory storage unit of said encrypted data; and D) wherein said memory storage unit further comprises a unique sequence of numbers randomly generated and stored in different locations in said memory storage unit means wherein said unique sequence of numbers is used as a seed to produce a key to decipher said encrypted data.

2. The combination in accordance with claim 1 wherein said programmable key comprises container means for holding said memory storage unit wherein said container means has a plurality of apertures equal in number to said plurality of terminal means for facilitating said plurality of terminal means to come in contact with said memory storage unit when said programmable key is inserted into said receptacle means.

3. The combination in accordance with claim 2 wherein said container means comprises:

a first shell having an indentation for holding said memory storage unit wherein said indentation has an aperture therethrough for facilitating one of said plurality of terminal means to come in contact with said memory storage unit when said programmable key is inserted into said receptacle means; and a second shell detachably coupled to said first shell and having an indentation for holding said memory storage unit wherein said indentation of said second shell has a center point in axial alignment with a center point of said indentation of said first shell, said second shell having at least two apertures therethrough for facilitating two of said plurality of terminal means to come in contact with said memory storage unit when said programmable key is inserted into said receptacle means.

4. The combination in accordance with claim 3 wherein said first shell means has a pair of side beveled edges which facilitates said programmable key to be inserted into said receptacle means in only a single manner.

5. The combination in accordance with claim 3 wherein said first shell and said second shell both have channeling running from a front edge of both said first shell and said second shell to each of said apertures in said first shell and said second shell for aligning said plurality of terminal means with an individual aperture to allow each of said plurality of terminal means to come in contact with said memory storage unit when said programmable key is inserted into said receptacle means for facilitating said programming device to read and program said memory storage unit.

6. The combination in accordance with claim 1 wherein said receptacle means comprises:

a front plate having a centrally located aperture wherein said programmable key is inserted through said aperture of said front plate to facilitate said receptacle means to read and program said programmable key; and terminal block coupled to said front plate for holding said plurality of terminal means for reading and programming said programmable key.

7. The combination in accordance with claim 6 wherein said plurality of terminal means comprises:

an input/output (I/O) terminal for reading and programming said memory storage unit;

a ground terminal for establishing ground potential; and an indicator terminal for indicating when said programmable key is properly inserted in said receptacle means so said receptacle means reads and programs said programmable key.

8. The combination in accordance with claim 7 wherein each of said I/O terminal, said ground terminal, and said indicator terminal comprises:

compression plunger means for contacting said memory storage unit when said programmable key is inserted into said receptacle means;

plunger spring means coupled to said compression plunger means for supporting said compression plunger and for providing electrical continuity between said memory storage unit and said programming device coupled to said receptacle means when said programmable key is inserted into said receptacle means; and holding means coupled to said plunger spring means for ensuring said plunger spring remains in contact with said compression plunger and for providing a contact for said programming device to be coupled to said receptacle means so said programming device reads and programs said programmable key when said programmable key is inserted into said receptacle means.

9. The combination in accordance with claim 6 wherein said receptacle means further comprises light emitting diode (LED) means coupled to said terminal means for visually indicating when said programmable key is properly inserted into said receptacle means and for visually indicating when said programmable key is being read and programmed.

10. The combination in accordance with claim 6 wherein said centrally located aperture of said receptacle means further comprises rounded edges which facilitates said programmable key to be inserted into said centrally located aperture of receptacle means in only a single manner.

11. A combination programmable key and programming system comprising, in combination:

A) receptacle means for reading and programming said programmable key wherein said receptacle means has a plurality of terminal means for contacting said programmable key for facilitating a programming device coupled to said receptacle means to read and program said programmable key, wherein said receptacle means comprises:

1) a front plate having a centrally located aperture wherein said programmable key is inserted through said aperture of said front plate to allow said receptacle means to read and program said programmable key and said centrally located aperture of said receptacle means further comprises rounded edges which facilitates said programmable key to be inserted into said centrally located aperture of receptacle means in only a single manner; and 2) terminal block coupled to said front plate for holding said plurality of terminal means to allow said terminal means to read and program said programmable key;

B) light emitting diode (LED) means coupled to said terminal means for visually indicating when said programmable key is properly inserted into said receptacle means and for visually indicating when said programmable key is being read and programmed; and C) a programmable key which is programmed and reprogrammed to store said encrypted data, wherein said programmable key comprises:

1) a memory storage unit wherein said memory storage unit is programmed and reprogrammed to store said encrypted data, wherein said memory storage unit comprises:

a) memory storage area means for storing said encrypted data;

b) a unique encoded serial number means stored within said memory storage area means for uniquely identifying said programmable key and for preventing unauthorized duplication of said memory storage unit;

c) counter register means stored in said memory storage area means for recording and monitoring transmissions to and from said memory storage unit of said encrypted data; and d) a unique sequence of numbers randomly generated and stored in different locations in said memory storage unit means wherein said unique sequence of numbers is used as a seed to produce a key to decipher said encrypted data;

2) a first shell having an indentation for holding said memory storage unit wherein said indentation has an aperture therethrough for facilitating one of said plurality of terminal means to come in contact with said memory storage unit when said programmable key is inserted into said receptacle means, said first shell further having a pair of side beveled edges which facilitates said programmable key to be inserted into said receptacle means in only a single manner; and 3) a second shell detachably coupled to said first shell and having an indentation for holding said memory storage unit wherein said indentation of said second shell has a center point in axial alignment with a center point of said indentation of said first shell, said second shell having at least two apertures therethrough for facilitating two of said plurality of terminal means to come in contact with said memory storage unit when said programmable key is inserted into said receptacle means, said first shell and said second shell both have channelling running from a front edge of both said first shell and said second shell to each of said apertures in said first shell and said second shell for aligning said plurality of terminal means with an individual aperture to allow each of said plurality of terminal means to come in contact with said memory storage unit when said programmable key is inserted into said receptacle means for facilitating said programming device to read and program said memory storage unit.

12. The combination in accordance with claim 11 wherein said plurality of terminal means comprises:

an input/output (I/O) terminal for reading and programming said memory storage unit;

a ground terminal for establishing ground potential; and an indicator terminal for indicating when said programmable key is properly inserted in said receptacle means so said receptacle means reads and programs said programmable key.

13. The combination in accordance with claim 12 wherein each of said I/O terminal, said ground terminal, and said indicator terminal further comprises:

compression plunger means for contacting said memory storage unit when said programmable key is inserted into said receptacle means;

plunger spring means coupled to said compression plunger means for supporting said compression plunger and for providing electrical continuity between said memory storage unit and a programming device coupled to said receptacle means when said programmable key is inserted into said receptacle means; and holding means coupled to said plunger spring means for ensuring said plunger spring remains in contact with said compression plunger and for providing a contact for said programming device to be coupled to said receptacle means so said programming device reads and programs said programmable key when said programmable key is inserted into said receptacle means.

14. A method of providing a combination programmable key for storing encrypted data and a receptacle system for reading and programming said programmable key comprising the steps of:

1) providing a programmable key having a memory storage unit wherein said memory storage unit is programmed and reprogrammed to store said encrypted data;

2) providing receptacle means for reading and programming said memory storage unit of said programmable key wherein said receptacle means has a plurality of terminal means for contacting said memory storage unit for facilitating a programming device coupled to said receptacle means to read and program said memory storage unit; and 3) wherein said step of providing a programmable key having a memory storage unit further comprises the steps of:

a) providing memory storage area means for storing said encrypted data;

b) providing a unique encoded serial number means stored within said memory storage area means for uniquely identifying said programmable key and for preventing unauthorized duplication of said memory storage unit;

c) providing counter register means stored in said memory storage area means for recording and monitoring transmissions to and from said memory storage unit of said encrypted data; and d) providing a unique sequence of numbers randomly generated and stored in different locations in said memory storage unit means wherein said unique sequence of numbers is used as a seed to produce a key to decipher said encrypted data.

15. The method of claim 14 wherein said step of providing said programmable key further comprises the steps of:

providing a first shell having an indentation for holding said memory storage unit wherein said indentation has an aperture therethrough for facilitating one of said plurality of terminal means to come in contact with said memory storage unit when said programmable key is inserted into said receptacle means, wherein said first shell means has a pair of side beveled edges which facilitates said programmable key to be inserted into said receptacle means in only a single manner; and providing a second shell detachably coupled to said first shell and having an indentation for holding said memory storage unit wherein said indentation of said second shell has a center point in axial alignment with a center point of said indentation of said first shell, said second shell having at least two apertures therethrough for facilitating two of said plurality of terminal means to come in contact with said memory storage unit when said programmable key is inserted into said receptacle means.

16. The method of claim 14 wherein said step of providing receptacle means further comprises the steps of:

providing a front plate having a centrally located aperture wherein said programmable key is inserted through said aperture of said front plate to allow said receptacle means to read and program said programmable key, wherein said centrally located aperture of said receptacle means further comprises rounded edges which facilitates said programmable key to be inserted into said centrally located aperture of receptacle means in only a single manner;

providing a terminal block coupled to said front plate for holding said plurality of terminal means for reading and programming said programmable key; and providing light emitting diode (LED) means coupled to said terminal means for visually indicating when said programmable key is properly inserted into said receptacle means and for visually indicating when said programmable key is being read and programmed.

17. The method of claim 14 wherein said step of providing receptacle means having a plurality of terminal means further comprises the steps of:

providing an input/output (I/O) terminal for reading and programming said memory storage unit;

providing a ground terminal for establishing ground potential; and providing an indicator terminal for indicating when said programmable key is properly inserted in said receptacle means so said receptacle means reads and programs said programmable key.

* * * * *